R. L. DEZENDORF.
APPARATUS FOR AND METHOD OF CLEARING SERVICE PIPES.
APPLICATION FILED FEB. 28, 1918.
1,328,726.
Patented Jan. 20, 1920.
2 SHEETS—SHEET 1.
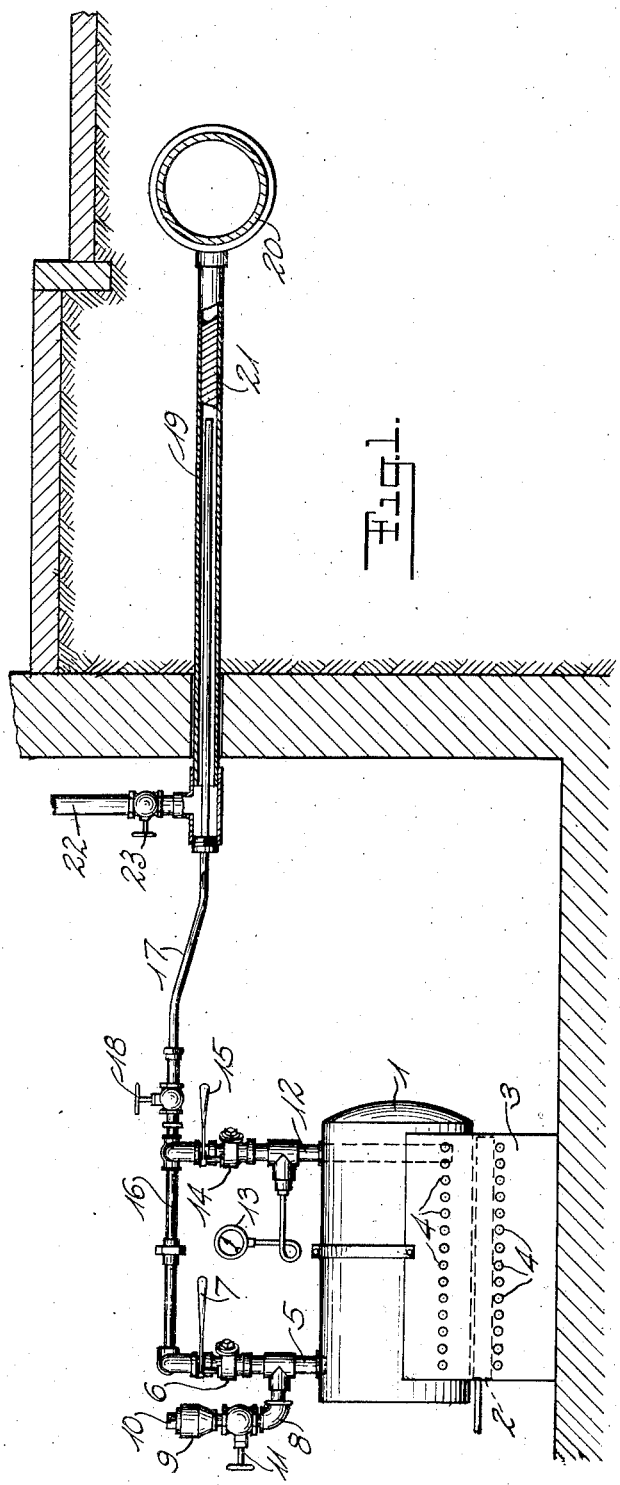
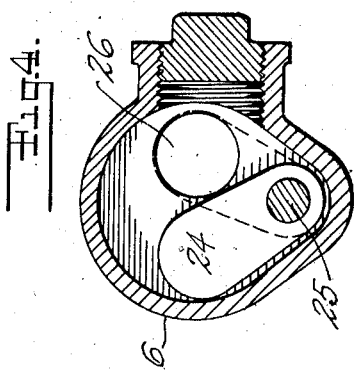
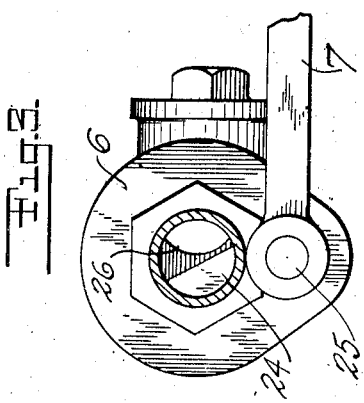
INVENTOR
R. L. Dezendorf.
BY
ATTORNEYS R. L. DEZENDORF.
APPARATUS FOR AND METHOD OF CLEARING SERVICE PIPES.
APPLICATION FILED FEB. 28, 1918.
1,328,726.
Patented Jan. 20, 1920.
2 SHEETS—SHEET 2.
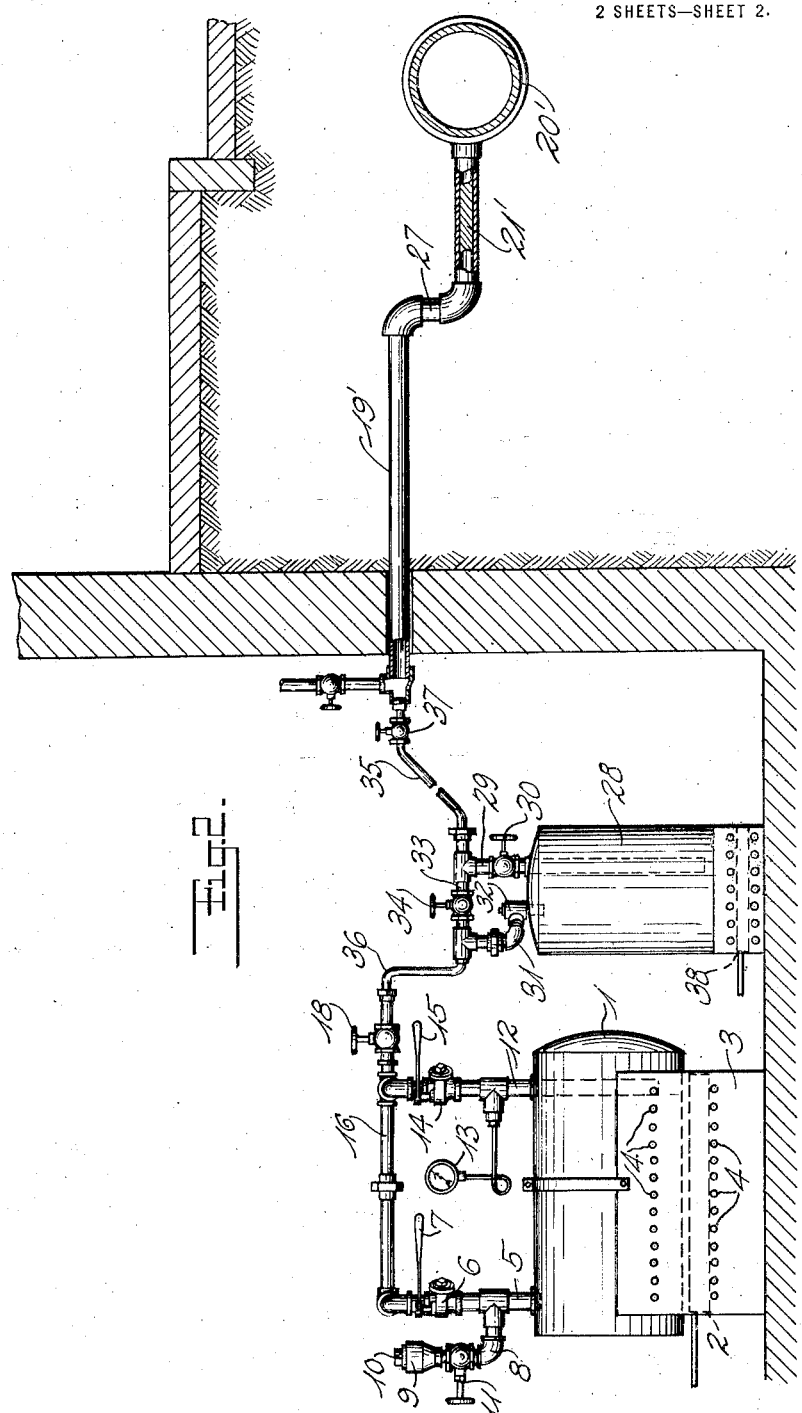
INVENTOR
R. L. Dezendorf.
BY
Bartlett & Brownell
ATTORNEYS

UNITED STATES PATENT OFFICE.

RICHARD LEE DEZENDORF, OF RICHMOND HILL, NEW YORK.

APPARATUS FOR AND METHOD OF CLEARING SERVICE-PIPES.

1,328,726.  Specification of Letters Patent.  Patented Jan. 20, 1920.

Application filed February 28, 1918. Serial No. 219,628.

*To all whom it may concern:*

Be it known that I, RICHARD L. DEZENDORF, a citizen of the United States, residing at Richmond Hill, county of Queens, State of New York, have invented a certain new and useful Improvement in Apparatus for and Methods of Clearing Service-Pipes, of which the following is a full, clear, and exact description.

My invention relates to an apparatus for and method of clearing service pipes and has for its object the clearing of service pipes in a satisfactory and expeditious manner. It further has for its object the clearing of service pipes when the obstruction is located at a distance from the outlet. It further has for its object to provide for clearing of gas service pipes in particular.

The following is a description of an embodiment of my invention, reference being had to the accompanying drawings, in which, Figure 1 shows an embodiment of my apparatus invention, which is adapted to carry out my process;

Fig. 2 shows a modified embodiment of my invention, which is adapted to carry out my process;

Fig. 3 is a plan view of a gate valve used in the apparatus, and

Fig. 4 is a sectional view of said gate valve.

Referring more particularly to the drawings, 1 is a tank having thereunder a heater 2, preferably in the form of a gasolene or alcohol torch located in a suitable inclosure 3, having perforations 4 for the admission of air and the escape of the products of combustion. 5 is a pipe entering the top of the tank and terminating in the upper portion thereof. This pipe is provided with a gate valve 6 operated by the handle 7 and with a branch 8 terminating in a filling cup 9 provided with a screw plug 10 for closing the same. 11 is a valve for controlling the passage through this branch. 12 is another pipe entering through the top of the tank and terminating near the bottom thereof. This pipe is provided with a pressure gage 13 and a gate valve 14 operated by the handle 15. The upper ends of these two pipes 5 and 12 are connected by a horizontal pipe 16 to which is connected a flexible hose 17, the pipe 16 being provided with a valve 18 for closing the passage therethrough. The flexible pipe 17 is of considerable length, as shown in Fig. 1, so as to be inserted within the service pipe to be cleared sufficiently to bring its end near to the obstruction to be removed. In Fig. 1 it is shown as being used in connection with a service pipe 19 leading from a gas main 20 and containing an obstruction 21. The service pipe is connected at 22 with the distribution system of the house, a valve 23 being interposed for cutting off that system. Obstructions in gas service pipes are due to moisture which in cold weather is liable to collect in such service pipes and sometimes to congeal, or it may be due to the accumulation of tarry matter carried along by the gas with which rust and pipe scalings become mixed.

The gate valves 6 and 14 are of ordinary construction, as shown in Fig. 4, consisting of a casing and a valve 24 mounted upon the spindle 25 and closing the port 26 in the valve casing.

In using the foregoing apparatus to carry out my improved process, I remove the plug 10 and, the valve 11 being open, fill the tank 1 through the cup 9 some two-thirds full with a suitable liquid, the liquid depending upon the nature of the obstruction to be removed. I then close the valve 11, the gate valves 6 and 14 and the valve 18. In case the obstruction is due to frozen moisture, I preferably fill the tank 1 with wood alcohol or the like. I then saturate the torch 2 with a suitable combustible, such as wood alcohol, or gasolene, and ignite the same heating the contents of the tank 1 so as to vaporize a portion of the same and allowing the pressure to rise until the pressure regulator 13 indicates some 75 pounds. I then remove the torch 2 and extinguish it. I then open the valve 18, having previously inserted the flexible tube 17 through the service pipe 19 until the end of the tube 17 is in proximity to the obstruction 21. I then quickly open the gate valve 14, which results in the sudden injection and discharge of a quantity of the heated contents of the tank 1 against the obstruction 21. When the pressure in the tank, as indicated by the pressure gage 13, falls to a marked degree, such for instance as to 50 pounds, I close the gate valve 14 and suddenly open the gate valve 6, permitting a dry charge of vaporizing fluid to pass through the pipe 17 in proximity to the obstruction 21, this being known as a hot dry charge. In many instances the hot wet charge, due to the opening of the gate valve 14, followed by the hot dry charge through the gate valve 6 results in the clearing of the service pipe from the obstruction 21. In case it does not result in such clearance I heat the tank 1 up a second time and deliver a second hot charge followed by a second dry charge and so continue until the obstruction disappears. The hot wet charges largely remove the obstruction and the removal is usually completed by the single hot dry charge which expands rapidly and acts quickly to brush out any remaining portions, doing its work with a much smaller consumption of the fluid contents of the tank 1 than if it were attempted to entirely remove the obstruction by the use of wet charges only. After the obstruction is removed, or partially removed, the removing agents may pass into the main 20 and mingle with the gas contained therein. When wood alcohol is used the same vaporizes quickly and does not seriously interfere with the gas contained in the mains, being taken up by the gas and discharged through the ordinary burners in conjunction therewith. Any excess fluid which may escape from the open inner end of the service pipe may be caught in any suitable container or vessel.

In some instances the process can be properly carried out by the use of water and steam in the tank 1 and sometimes it is advisable to use a mixture of kerosene and wood alcohol, particularly if the obstruction 21 is caused by the accumulation of tarry matter.

In some instances the service pipes have bends 27 beyond which obstruction 21′ is located. In that case a flexible tube cannot be introduced into close proximity to the obstruction, and where that is the case I find it advisable to fill the entire service pipe with some suitable liquid under pressure, such for instance as wood alcohol, kerosene or a mixture of wood alcohol and kerosene, and the like. In that case, in order to have the fluid to be injected in a separate tank from the pressure producing liquid, or to have a larger volume of liquid accessible, I prefer to employ a supplemental tank 28, having an outlet pipe 29 extending to near the bottom thereof and controlled by a valve 30 and also an inlet pipe 31, provided with a screw plug 32 for filling the tank 28. The pipes 29 and 31 have their upper ends connected by a pipe 33 provided with a valve 34. From one end of this pipe 33 a flexible connection 35 extends while the other end of the pipe 33 is connected by a flexible pipe 36 to the discharge end of the pipe 16. I then by a screw coupling make a solid connection between the free end of the flexible pipe 35 with the open end of the service pipe 19′, providing a cock 37 between the flexible pipe 35 and the screw coupling to hold the charge within the service pipe when desired. I preferably provide means for heating the tank 28 such as a gasolene or alcohol torch 38.

In using this apparatus to carry out my invention, I ignite the torch 2 or both torches 2 and 38 so as to heat both of the tanks 1 and 28. When the pressure in the tank 1 has risen to some 75 pounds, I extinguish the torches 2 and 38 and then, having closed the valve 34 and opened the valve 37, I open the valve 18 and the gate valve 6, the gate valve 14 being closed, until a portion of the vaporized contents of the tank 1 has passed to the tank 28, forcing part of the contents of the tank 28 into the pipe 19′. After the service pipe 19 has been filled with liquid from the tank 28, I then close the valve 30 and open the valve 34 so as to permit a hot dry charge of vaporized fluid to pass by the tank 28 directly to the pipe 19. If at this time the obstruction 21′ has been partially dislodged the hot dry charge will force the liquid in the pipe 19′ into the main 20′ and complete the clearance of the service pipe.

The apparatus of Fig. 2 is preferably employed when it is desirable to use for injection a liquid which would be undesirable in tank 1, for instance, when it is desired to use kerosene or a mixture of kerosene and wood alcohol. When tank 28 contains such liquid, tank 1 may be filled with water. It is not necessary under all circumstances to heat the tank 28, and it may be used with its contents heated or not according to special conditions. The heat applied to the tank 28 is for the purpose of heating the contents thereof to the desired point and ordinarily it is not for the purpose of generating an injecting pressure therein.

Both the tanks 1 and 28 should be capable of withstanding pressure of some 250 pounds so as to provide a large margin for safety.

In operating either form of my apparatus or method, when appearances indicate that the obstruction has been removed, the valves 18 or 37, or both of them, are thereupon closed so as to prevent the further discharge. For convenience, I find that it is desirable to have the tank 1 of a capacity of about 10 gallons and that the capacity of the tank 28 should be about 5 gallons. The hot dry charge which is introduced into the service pipes 19 or 19′ serves to heat up their contents or maintain them in heated condition and also serves to quickly expel the obstructions after they have once been somewhat loosened or removed by the hot charge.

In case the service pipe is so large that the contents of the second tank does not fill it, the cock 18 may be closed and the second tank 28 re-filled and emptied in the manner described as often as is necessary, a comparatively small amount of the liquid in tank 1 being sufficient to produce the necessary vapor pressure for discharging the tank 28 a number of times.

In some instances I use a hot dry charge alone in removing obstructions by discharging it through the pipe 17 at a point adjacent to the obstruction. Hot wet charges of wood alcohol, or hot dry charges of wood alcohol vapor, or both, are very efficacious in clearing pipes of frozen moisture and I believe that I am the first to employ either of them for that purpose in the manner described.

As will be evident to those skilled in the art, my invention permits of various modifications without departing from the spirit thereof or the scope of the appended claims.

What I claim is:

1. The process of clearing service pipes, which consists in injecting into the pipe to be cleared a wet charge and following the same by a hot dry charge.

2. The process of clearing service pipes, which consists in injecting into the pipe to be cleared a hot wet charge and following the same by a dry charge.

3. The process of clearing service pipes, which consists in injecting into the pipe to be cleared a hot wet charge comprising alcohol and following the same by a dry charge.

4. The process of clearing service pipes from an obstruction located at a distance remote from the discharge end of said pipe, which consists in introducing through said discharge end a pipe so that its inner end is in proximity to the obstruction, discharging through said pipe a wet charge and then a dry charge.

5. The process of clearing service pipes from an obstruction located at a distance remote from the discharge end of said pipe, which consists in introducing through said discharge end a pipe so that its inner end is in proximity to the obstruction, discharging through said pipe a hot wet charge and then a dry charge.

6. The process of clearing service pipes from an obstruction located at a distance remote from the discharge end of said pipe, which consists in introducing through said discharge end a pipe so that its inner end is in proximity to the obstruction, discharging through said pipe a wet charge and then a hot dry charge.

7. The process of clearing service pipes from an obstruction located at a distance remote from the discharge end of said pipe, which consists in introducing through said discharge end a pipe so that its inner end is in proximity to the obstruction, discharging through said pipe a hot wet charge and then a hot dry charge.

8. In an apparatus for clearing a service pipe, the combination of means for storing heated vapor and liquid under pressure, and means for discharging into said pipe successively portions of said liquid and heated vapor.

9. In an apparatus for clearing a service pipe, the combination of means for storing liquid under pressure, a source of heat for converting a portion of said liquid into vapor, and means for discharging portions of said liquid and vapor into the pipe successively.

10. In an apparatus for clearing a service pipe, the combination of means for storing liquid under pressure, a source of heat for converting a portion of said liquid into vapor, and means for discharging portions of said liquid and vapor into the pipe successively at a point remote from the discharge end of said pipe.

RICHARD LEE DEZENDORF.